US012062936B2

(12) United States Patent
Sato et al.

(10) Patent No.: US 12,062,936 B2
(45) **Date of Patent: *Aug. 13, 2024**

(54) CONTROLLING POWER SUPPLY FROM AN ELECTRIC POWER SOURCE TO COMMUNICATION FACILITIES IN A COMMUNICATION SYSTEM

(71) Applicant: Nippon Telegraph and Telephone Corporation, Tokyo (JP)

(72) Inventors: Noriyuki Sato, Musashino (JP); Takayuki Furuya, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 55 days.

This patent is subject to a terminal disclaimer.

(21) Appl. No.: 17/802,000

(22) PCT Filed: Feb. 28, 2020

(86) PCT No.: PCT/JP2020/008333
§ 371 (c)(1),
(2) Date: Aug. 24, 2022

(87) PCT Pub. No.: WO2021/171559
PCT Pub. Date: Sep. 2, 2021

(65) Prior Publication Data

US 2023/0099662 A1 Mar. 30, 2023

(51) Int. Cl.

| | |
|---|---|
| ***G06F 1/28*** | (2006.01) |
| ***H02J 1/00*** | (2006.01) |
| ***H02J 7/00*** | (2006.01) |

(52) U.S. Cl.
CPC .............. *H02J 7/0063* (2013.01); *G06F 1/28* (2013.01); *H02J 1/00* (2013.01)

(58) Field of Classification Search
CPC ..... G06F 1/28; G06F 1/26; G06F 1/30; G06F 1/305; G06F 1/3206; G06F 1/3209;
(Continued)

(56) References Cited

U.S. PATENT DOCUMENTS

| | | | | |
|---|---|---|---|---|
| 6,614,133 B2 * | 9/2003 | Belson | .................... | H02J 9/005 307/29 |
| 9,705,321 B1 * | 7/2017 | Frink | ........................ | H02J 9/06 |

(Continued)

FOREIGN PATENT DOCUMENTS

| | | |
|---|---|---|
| JP | S50151422 | 12/1975 |
| JP | H04134994 | 5/1992 |

(Continued)

OTHER PUBLICATIONS

Takeda et al., "Research and development of power supply system and communication power supply," NTT Technical Journal, 2001, 13(11):44-49, 13 pages (with English Translation).

*Primary Examiner* — Raymond N Phan
(74) *Attorney, Agent, or Firm* — Fish & Richardson P.C.

(57) ABSTRACT

A power source supply control device supplies electric power to independent loads from a common main power source or main power sources. The control device includes: switch units configured to switch electric power supply to the loads from the main power source; a plurality of power source monitor units each configured to monitor a power source state in each of power source lines at a downstream side of the switch units; and a switch control unit configured to control each of the switch units sequentially. The switch control unit specifies a switching order to the loads according to a predetermined state, and switches the switch unit that controls energization to a second load, after a power source meets a predetermined condition, based on output of the power source monitor unit that monitors electric power (Continued)

supply to a first load whose switching order is earlier than the second load.

7 Claims, 10 Drawing Sheets

(58) Field of Classification Search
CPC .... G06F 1/3012; G06F 1/3215; G06F 1/3228; G06F 1/3231
See application file for complete search history.

(56) References Cited

U.S. PATENT DOCUMENTS

| | | | | |
|---|---|---|---|---|
| 11,901,728 | B2 * | 2/2024 | Sato | H02J 9/061 |
| 2014/0132070 | A1 * | 5/2014 | Kuan | H02J 9/061 307/29 |
| 2014/0164813 | A1 * | 6/2014 | Alshinnawi | G06F 1/3287 713/330 |
| 2014/0292297 | A1 * | 10/2014 | Jutras | H02J 7/00047 323/282 |
| 2015/0153815 | A1 * | 6/2015 | Ito | G06F 1/30 713/323 |
| 2018/0032124 | A1 * | 2/2018 | Fukuoka | G06F 1/3296 |
| 2018/0248381 | A1 * | 8/2018 | Lewis | H02J 7/005 |
| 2020/0110454 | A1 * | 4/2020 | Yang | H02J 7/34 |
| 2021/0149468 | A1 * | 5/2021 | Walsh | H02J 1/084 |

FOREIGN PATENT DOCUMENTS

| | | |
|---|---|---|
| JP | H11243640 | 9/1999 |
| JP | 2016045656 | 4/2016 |

* cited by examiner

| LOAD NUMBER | LOAD TYPE | STARTING ORDER |
| --- | --- | --- |
| 1 | COMMUNICATION FACILITY A1 | 1 |
| 2 | COMMUNICATION FACILITY A2 | 2 |
| ⋮ | ⋮ | ⋮ |
| N | COMMUNICATION FACILITY AN | N |

| LOAD NUMBER | LOAD TYPE | POWER SOURCE CONDITION |
|---|---|---|
| 1 | COMMUNICATION FACILITY A1 | $Vmin1 \leqq Vx \leqq Vmax1$ |
| 2 | COMMUNICATION FACILITY A2 | $Vmin2 \leqq Vx \leqq Vmax2$ |
| ⋮ | ⋮ | ⋮ |
| N | COMMUNICATION FACILITY AN | $VminN \leqq Vx \leqq VmaxN$ |

CONTROLLING POWER SUPPLY FROM AN ELECTRIC POWER SOURCE TO COMMUNICATION FACILITIES IN A COMMUNICATION SYSTEM

CROSS-REFERENCE TO RELATED APPLICATIONS

This application is a National Stage application under 35 U.S.C. § 371 of International Application No. PCT/JP2020/008333, having an International Filing Date of Feb. 28, 2020, the disclosure of which is considered part of the disclosure of this application, and is incorporated by reference in its entirety into this application.

TECHNICAL FIELD

The present invention relates to a power source supply control device for communication facilities, a power source supply control method, a power source supply control program, and a power source supply control system that are usable to control overall power source supply in a system in which a plurality of independent communication facilities are respectively loads to be controlled.

BACKGROUND ART

Various communication facilities require supply of stable power source electric power to operate stably. Accordingly, it is expected that stable power source electric power is supplied to the respective communication facilities by applying the technology as shown in Non-Patent Literature 1, for example.

CITATION LIST

Non-Patent Literature

Non-Patent Literature 1: Takeda Takashi, et al. "Research and Development of Power Feeding System and Power Source for Communication", NTT GIJUTSU Journal, November, 2001, pp 44-49.

SUMMARY OF THE INVENTION

Technical Problem

In a communication system of a relatively large scale, it is necessary to manage a plurality of communication facilities that are independent from one another at the same time. For example, in a communication system that provides a public telephone line and includes telephone exchanges, it is necessary to continuously maintain communication functions to be provided for the users so that such functions are not interrupted even if some kind of failure occurs or if the maintenance or inspection of the facilities is carried out. Accordingly, it is necessary to prepare a plurality of backup facilities in addition to the communication facilities that are normally used or make the communication path redundant. Furthermore, with sophistication of the system, it is also necessary to manage, for example, a special communication facility for connecting to the IP (Internet Protocol) network, and a plurality of relay devices, at the same time.

In the communication system as described above, it is necessary to operate each of a plurality of communication facilities that are independent from one another in a stable state. Furthermore, in an environment in which a plurality of communication facilities are operated in a state of being connected to one another, a problem such as an error may occur if the order in which the respective communication facilities are activated is different from the state that is assumed in advance. Furthermore, it takes a certain amount of time from the start of power source electric power supply to each of the communication facilities from a predetermined main power source until each of the communication facilities is in a stable operating state. Furthermore, when starting the power source electric power supply to each of the communication facilities, a very large inrush current tends to flow temporarily, so that if power source electric power supply to many communication facilities is started at the same time, the main power source is overloaded to lose a function of the main power source, or the operation of the main power source may become unstable. If the operation of the main power source becomes unstable, it may be a cause of preventing each of the communication facilities from operating normally.

Accordingly, in the communication system as described above that includes many communication facilities, it is necessary to start electric power supply in order to each of the plurality of communication facilities from a common main power source, in accordance with the predetermined order by the designer of the system. The same applies to the case of stopping the power source electric power supply to each of the communication facilities.

Since the types of the communication facilities that are objects to be controlled and the magnitudes of the loads thereof vary, and the electric power supply capacity of the main power source is not always constant, there is a concern that the operations of the main power source and each of the communication facilities may become unstable only by starting electric power supply in order to each of the plurality of communication facilities. Accordingly, even if a sequencer that is an ordinary control device is used, start and stop of supply of the power source electric power to the plurality of communication facilities cannot be properly controlled. Consequently, operation managers of the facilities have conventionally performed operations of starting/stopping power source electric power supply to many communication facilities manually in accordance with the predefined procedures. In particular, when a plurality of communication facilities are sequentially activated, careful operation is required to operate the system in a stable state. Accordingly, when a skilled operation manager is absent, a starting operation of an important communication system cannot be performed.

The present invention is made in the light of the above described situation and has an object to provide a power source supply control device for communication facilities, a power source supply control method, a power source supply control program, and a power source supply control system that are capable of performing power source electric power supply operation for activating a plurality of communication facilities in a stable state, in an unmanned manner.

Means for Solving the Problem (1) A power source supply control device for communication facilities of the present invention is a power source supply control device for communication facilities, the power source supply control device being for supplying power source electric power to a plurality of independent loads constituting communication facilities respectively from a common main power source, or a plurality of main power sources belonging to a same system, including a plurality of controllable switch units configured to switch provision or non-provision of power source electric power supply to the respective plurality of loads from the main power source, a plurality of power source monitor units each configured to monitor a power source state in each of power source lines at a downstream side of one or more of the plurality of switch units, and a switch control unit configured to control on/off of each of the plurality of switch units sequentially, based on monitor situations of the plurality of power source monitor units, wherein the switch control unit specifies an energization switching order to the plurality of loads according to a predetermined state, and switches on/off of the switch unit that controls energization to a second load, after a power source is in a state that meets a predetermined condition, based on output of the power source monitor unit that monitors electric power supply to a first load the energization switching order of which is earlier than the second load that is an object to be switched.

According to the power source supply control device for communication facilities of the present invention, it becomes possible to perform a power source electric power supply operation for operating the plurality of communication facilities in a stable state, in an unmanned manner. For example, when starting power source electric power supply to the second load after starting the power source electric power supply to the first load, there is a possibility that the output voltage of the main power source temporarily declines, or the voltage fluctuates, due to an influence of start of energization to the first load. However, the power source supply control device for communication facilities of the present invention can start power source electric power supply to the second load after waiting until the state of the power source electric power supply to be supplied to the first load becomes a predetermined state. The power source electric power supply to the second load is started in the state in which the output voltage of the main power source is stabilized, and thereby the operation of the second load can be started in a stable state. Furthermore, the plurality of power source monitor units monitor the power source states in the power source lines at the downstream sides of the plurality of switch units, so that it is possible to reliably prevent electric power supply to the second load from starting before the switch unit the order of which is earlier is switched. Furthermore, when electric power supply to the first load cannot be performed due to the influence of a blown fuse or the like, the operation of the second load can be prevented from starting in the state in which the operation of the first load is not started. Furthermore, the power source electric power is sequentially supplied to the plurality of loads in the predetermined order, so that it becomes easy to prevent the main power source from being overloaded.

(2) A power source supply control method of the present invention is a power source supply control method for supplying power source electric power to a plurality of independent loads constituting communication facilities respectively from a common main power source, or a plurality of main power sources belonging to a same system, including specifying an energization switching order to the plurality of loads, according to a predetermined state, monitoring electric power supply to a first load the energization switching order of which is earlier than a second load that is an object to be switched, among the plurality of loads, and switching on/off of energization to the second load after an electric power supply state that is monitored becomes a state that meets a predetermined condition.

According to the power source supply control method of the present invention, it becomes possible to perform the power source electric power supply operation for operating the plurality of communication facilities in a stable state in an unmanned manner. For example, when starting the power source electric power supply to the second load after starting the power source electric power supply to the first load, there is a possibility that the output voltage of the main power source temporarily declines or the voltage fluctuates, due to the influence of start of energization to the first load. However, in the power source supply control method for communication facilities of the present invention, it is possible to start the power source electric power supply to the second load after waiting until the state of the power source electric power supply to be supplied to the first load becomes a predetermined state. The power source electric power supply to the second load is started in the state in which the output voltage of the main power source is stabilized, and thereby the operation of the second load can be started in a stable state. Furthermore, by monitoring an actual electric power supply state for each load, it is possible to prevent an error from occurring in the order of energization to the respective loads. Further, since the power source electric power is sequentially supplied to the plurality of loads in the predetermined order, so that it becomes easy to prevent the main power source from being overloaded.

(3) A power source supply control program of the present invention is a power source supply control program that can be executed by a predetermined computer that performs control to supply power source electric power to a plurality of independent loads constituting communication facilities respectively from a common main power source, or a plurality of main power sources belonging to a same system, including a procedure of specifying an energization switching order to the plurality of loads, according to a predetermined state, a procedure of monitoring electric power supply to a first load the energization switching order of which is earlier than a second load that is an object to be switched, among the plurality of loads, and a procedure of switching on/off of energization to the second load after an electric power supply state that is monitored becomes a state that meets a predetermined condition.

By controlling the system by executing the power source supply control program of the present invention by the predetermined computer, it becomes possible to perform the power source electric power supply operation for operating the plurality of communication facilities in a stable state, in an unmanned manner. For example, when the power source electric power supply to the second load is started after the power source electric power supply to the first load is started, there is a possibility that the output voltage of the main power source temporarily declines, or the voltage fluctuates, due to the influence of start of energization to the first load. However, in the power source supply control program for communication facilities of the present invention, it is possible to start the power source electric power supply to the second load after waiting until the state of the power source electric power supply to be supplied to the first load becomes a predetermined state. The power source electric power supply to the second load is started in the state in which the output voltage of the main power source is stabilized, and thereby the operation of the second load can be started in the stable state. Furthermore, by monitoring an actual electric power supply state for each load, it is possible to prevent an error from occurring in the order of energization to the respective loads. Furthermore, the power source electric power is sequentially supplied to the plurality of loads in the predetermined order, so that it becomes easy to prevent the main power source from being overloaded.

(4) A power source supply control system of the present invention is a power source supply control system including a plurality of independent loads constituting communication facilities, a common main power source that can supply power source electric power to the respective plurality of loads, or a plurality of main power sources that belong to a same system, and a control unit that controls electric power supply to the plurality of loads from the main power source, including

- a plurality of controllable switch units configured to switch provision or non-provision of power source electric power supply to the respective plurality of loads from the main power source,
- a plurality of power source monitor units each configured to monitor a power source state in each of power source lines at a downstream side of one or more of the plurality of switch units, and
- a switch control unit configured to control on/off of each of the plurality of switch units sequentially, based on monitor situations of the plurality of power source monitor units,
- wherein the switch control unit specifies an energization switching order to the plurality of loads according to a predetermined state, and switches on/off of the switch unit that controls energization to a second load, after a power source is in a state that meets a predetermined condition, based on output of the power source monitor unit that monitors electric power supply to a first load the energization switching order of which is earlier than the second load that is an object to be switched.

According to the power source supply control system of the present invention, it becomes possible to perform power source electric power supply operation for operating the plurality of communication facilities in a stable state, in an unmanned manner. For example, when starting the power source electric power supply to the second load after starting the power source electric power supply to the first load, there is a possibility that the output voltage of the main power source temporarily declines, or the voltage fluctuates, due to an influence of start of energization to the first load. However, the power source supply control system of the present invention can start the power source electric power supply to the second load after waiting until the state of the power source electric power supply to be supplied to the first load becomes a predetermined state. The power source electric power supply to the second load is started in the state in which the output voltage of the main power source is stabilized, and thereby the operation of the second load can be started in a stable state. Furthermore, the plurality of power source monitor units monitor the power source states in the power source lines at the downstream sides of the plurality of switch units, so that electric power supply to the second load can be reliably prevented from starting before the switch unit the order of which is earlier is switched. Furthermore, when electric power supply to the first load cannot be performed due to the influence of a blown fuse or the like, the operation of the second load can be prevented from starting in the state in which the operation of the first load is not started. Furthermore, the power source electric power is sequentially supplied to the plurality of loads in the predetermined order, so that it becomes easy to prevent the main power source from being overloaded.

Effects of the Invention

According to the power source supply control device for communication facilities, the power source supply control method, the power source supply control program, and the power source supply control system of the present invention, it becomes possible to perform the power source electric power supply operation for operating a plurality of communication facilities in a stable state, in an unmanned manner. Furthermore, since it is not necessary for humans to perform the power source electric power supply operation, occurrence of an error operation can also be prevented.

BRIEF DESCRIPTION OF DRAWINGS

FIG. 5 is a schematic diagram showing a configuration example of supply starting order data.

FIG. 6 is a schematic diagram showing a configuration example of power source condition data for each communication facility.

DESCRIPTION OF EMBODIMENTS

First Embodiment

<Configuration Example of Communication System>

Figure 1:
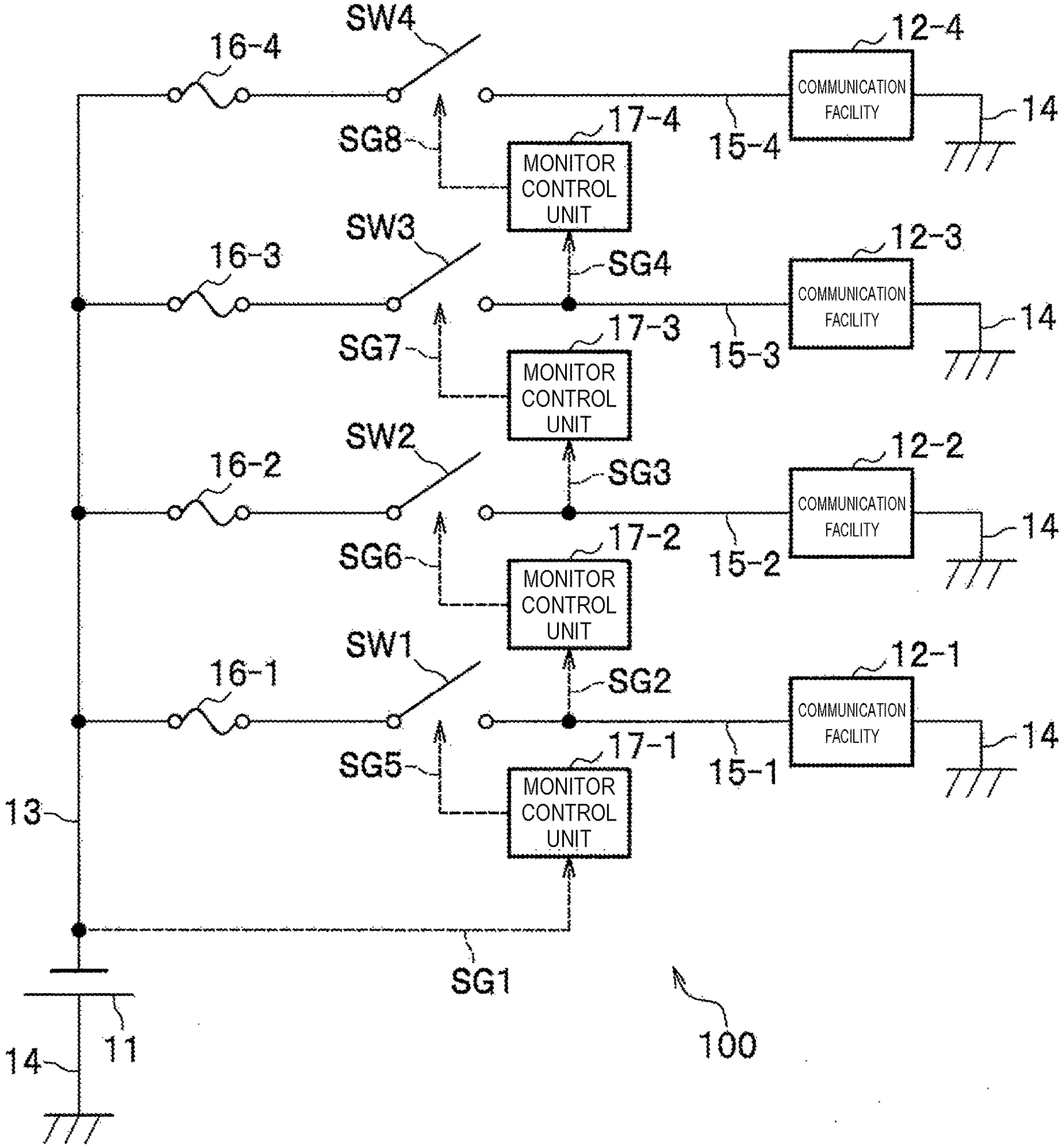
FIG. 1 is a block diagram showing a configuration example of a communication system including a power source supply control device of a first embodiment of the present invention.

A configuration example of a communication system including a power source supply control device 100 of a first embodiment of the present invention is shown in FIG. 1. The communication system is used to provide a service of a public telephone line to users, for example. As a matter of course, the present invention can also be applied to communication facilities for other purposes.

The communication system shown in FIG. 1 has a plurality of communication facilities 12-1, 12-2, 12-3, and 12-4 that are independent from one another. These communication facilities 12-1 to 12-4 each require DC power source electric power to operate. In the example of FIG. 1, the power source supply control device 100 supplies power source electric power to the communication facility 12-1 via a load side power source line 15-1. Furthermore, the power source supply control device 100 supplies the power source electric power to the communication facility 12-2 via a load side power source line 15-2. Furthermore, the power source supply control device 100 supplies the power source electric power to the communication facility 12-3 via a load side power source line 15-3. Furthermore, the power source supply control device 100 supplies the power source electric power to the communication facility 12-4 via a load side power source line 15-4.

A main power source 11 is, for example, a storage battery, and can supply DC power source electric power to a load side via a power source line 13 and an earth line 14. The power source supply control device 100 shown in FIG. 1 supplies power source electric power to the respective communication facilities 12-1 to 12-4 via the load side power source line 15-1 to 15-4 from the common main power source 11 in an appropriate order and under appropriate conditions with these communication facilities 12-1 to 12-4 as loads to be controlled, when starting operations of the plurality of communication facilities 12-1 to 12-4. Note that in the example of FIG. 1, it is assumed that the power source electric power is supplied to each of the loads from the one main power source 11, but, for example, a positive polarity main power source, and a negative polarity main power source that belong to a same system may be used, and from the plurality of main power sources, power source electric power may be supplied to each of the loads.

Note that as for the power source supply control device 100, it is also possible to change the configuration to cut off the power source electric power supply from the main power source 11 in an appropriate order and under appropriate conditions when stopping the operations of the plurality of communication facilities 12-1 to 12-4 that are objects to be controlled.

By determining the order to activate and the conditions to switch the respective communication facilities 12-1 to 12-4, the power source supply control device 100 can bring the respective communication facilities 12-1 to 12-4 into a stable operating state when activating the respective communication facilities 12-1 to 12-4. Furthermore, the power source supply control device 100 shifts timings of start of the power source electric power supply to the plurality of communication facilities 12-1 to 12-4, and thereby can prevent a large power source current from flowing at a same timing and can prevent the main power source 11 from being overloaded. Thereby, the power source supply control device 100 can avoid error operations of the respective communication facilities 12-1 to 12-4.

In the case of the power source supply control device 100 shown in FIG. 1, it is assumed that types and characteristics of the communication facilities 12-1 to 12-4 that are respectively connected to downstream of the load side power source lines 15-1 to 15-4 are fixed in advance. Furthermore, regarding the order in which the plurality of communication facilities 12-1 to 12-4 are activated, the communication facility 12-1 is fixed as the first, the communication facility 12-2 is fixed as the second, the communication facility 12-3 is fixed as the third, and the communication facility 12-4 is fixed as the fourth. Consequently, an electric power supply starting order at the time of activating the plurality of communication facilities 12-1 to 12-4 is fixedly determined by the circuit configuration of the power source supply control device 100.

The power source line 13 and the load side power source line 15-1 are connected via a series circuit of a fuse 16-1 and a switch SW1. Likewise, the power source line 13 and the load side power source line 15-2 are connected via a series circuit of a fuse 16-2 and a switch SW2. The power source line 13 and the load side power source line 15-3 are connected via a series circuit of a fuse 16-3 and a switch SW3. The power source line 13 and the load side power source line 15-4 are connected via a series circuit of a fuse 16-4 and a switch SW4.

The switches SW1 to SW4 each have a contact capable of being controlled to be turned on/off individually such as a relay, for example. In a state in which a contact of the switch SW1 is opened as in FIG. 1, the power source electric power is not supplied to the communication facility 12-1, and when the contact of the switch SW1 is closed, the power source electric power from the main power source 11 is supplied to the communication facility 12-1 via the load side power source line 15-1 and the communication facility 12-1 starts activation.

As in the above description, when a contact of the switch SW2 is closed, the power source electric power from the main power source 11 is supplied to the communication facility 12-2, when a contact of the switch SW3 is closed, the power source electric power from the main power source 11 is supplied to the communication facility 12-3, and when a contact of the switch SW4 is closed, the power source electric power from the main power source 11 is supplied to the communication facility 12-4.

The power source supply control device 100 shown in FIG. 1 includes four monitor control units 17-1, 17-2, 17-3, and 17-4 that are independent from one another.

A first monitor control unit 17-1 controls on/off of the power source electric power supply to the first communication facility 12-1 that is a load to be controlled. For that purpose, the monitor control unit 17-1 monitors a state, specifically, a voltage, of the power source of the power source line 13 that is in a higher level than the load side power source line 15-1, and compares the state with a predetermined condition according to the characteristics of the communication facility 12-1. The monitor control unit 17-1 generates a control signal SG5 based on the comparison result, and switches on/off of the switch SW1. In other words, when the voltage of the power source line 13 satisfies an activation start condition of the communication facility 12-1, the monitor control unit 17-1 closes the contact of the switch SW1 to start the power source electric power supply to the communication facility 12-1.

A second monitor control unit 17-2 controls on/off of the power source electric power supply to the second communication facility 12-2 that is a load to be controlled. For this purpose, the monitor control unit 17-2 monitors a state of a power source, specifically, a voltage, in the load side power source line 15-1 of the first communication facility 12-1 to which electric power supply is started earlier than the communication facility 12-2, and compares the state with a predetermined condition according to characteristics of the communication facility 12-2. The monitor control unit 17-2 generates a control signal SG6 based on a result of the comparison and switches on/off of the switch SW2. In other words, when the voltage of the first load side power source line 15-1 in a higher level satisfies an activation start condition of the second communication facility 12-2, the monitor control unit 17-2 closes the contact of the switch SW2 to start the power source electric power supply to the communication facility 12-2.

A third monitor control unit 17-3 controls on/off of the power source electric power supply to the third communication facility 12-3 that is a load to be controlled. For this purpose, the monitor control unit 17-3 monitors a state of a power source, specifically, a voltage, in the load side power source line 15-2 of the second communication facility 12-2 to which electric power supply is started earlier than the communication facility 12-3, and compares the state with a predetermined condition according to characteristics of the communication facility 12-3. The monitor control unit 17-3 generates a control signal SG7 based on a result of the comparison and switches on/off of the switch SW3. In other words, when the voltage of the second load side power source line 15-2 of a higher level satisfies an activation start condition of the third communication facility 12-3, the monitor control unit 17-3 closes the contact of the switch SW3 to start power source electric power supply to the communication facility 12-3.

A fourth monitor control unit 17-4 controls on/off of the power source electric power supply to the fourth communication facility 12-4 that is a load to be controlled. For this purpose, the monitor control unit 17-4 monitors a state of a power source, specifically, a voltage, in the load side power source line 15-3 of the third communication facility 12-3 to which electric power supply is started earlier than the communication facility 12-4, and compares the state with a predetermined condition according to characteristics of the communication facility 12-4. The monitor control unit 17-4 generates a control signal SG8 based on a result of the above and switches on/off of the switch SW4. In other words, when the voltage of the third load side power source line 15-3 of a higher level satisfies an activation start condition of the fourth communication facility 12-4, the monitor control unit 17-4 closes the contact of the switch SW4 to start power source electric power supply to the communication facility 12-4.

Note that regarding the state of the power source monitored by each of the monitor control units 17-1 to 17-4, a current may be monitored instead of the voltage, or both the voltage and current may be monitored, or a fluctuation amount of either the voltage or the current may be monitored.

<Operation Example>

Figure 2:
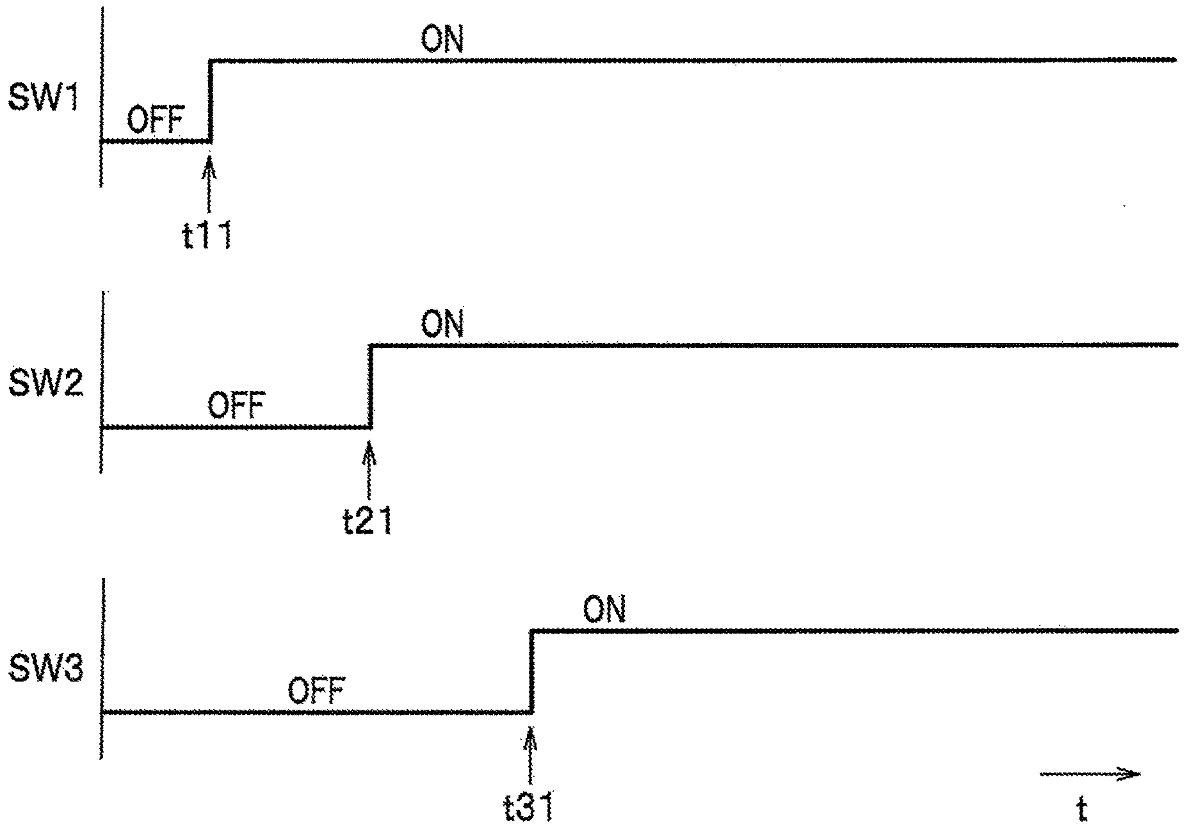
FIG. 2 is a time chart showing an operation example of the power source supply control device shown in FIG. 1.

An operation example of the power source supply control device 100 shown in FIG. 1 is shown in FIG. 2. In FIG. 2, a vertical axis represents on/off (ON/OFF) states of the respective switches SW1 to SW3, and a horizontal axis represents a time t.

In the communication system shown in FIG. 1, it is necessary to start power source electric power supply to the first communication facility 12-1, the second communication facility 12-2, the third communication facility 12-3, . . . in this order. Accordingly, the power source supply control device 100 in FIG. 1 switches the switch SW1 from off to on at a time t11, then switches the switch SW2 from off to on at a subsequent time t21, and then switches the switch SW3 from off to on at a subsequent time t31, as shown in FIG. 2.

The time t11 shown in FIG. 2 is determined based on comparison of a power source state of the power source line 13 which the monitor control unit 17-1 monitors by the monitor signal SG1, and information on the power source condition that is retained by the monitor control unit 17-1.

Furthermore, the time t21 is determined based on comparison of the power source state of the load side power source line 15-1 which the monitor control unit 17-2 monitors by the monitor signal SG2, and information on the power source condition retained by the monitor control unit 17-2. Here, the electric power of the first load side power source line 15-1 the order of which is higher than the second load side power source line 15-2 does not appear as long as the first switch SW1 is not turned on, and therefore the time t21 at which the second switch SW2 is switched to on is definitely after the first time t11. Furthermore, if the fuse 16-1 is blown, for example, the second switch SW2 is not switched to on even after the first switch SW1 is turned on.

Likewise, the time t31 is determined based on comparison of the power source state of the load side power source line 15-2 which the monitor control unit 17-3 monitors by the monitor signal SG3, and information on the power source condition retained by the monitor control unit 17-3. Here, the electric power of the second load side power source line 15-2 the order of which is higher than the third load side power source line 15-3 does not appear as long as the second switch SW2 is not turned on, and therefore the time t31 at which the third switch SW3 is switched to on is definitely after the second time t21. Furthermore, if the fuse 16-2 is blown, for example, the third switch SW3 is not switched to on even after the second switch SW2 is turned on.

Furthermore, the respective monitor control units 17-1 to 17-4 of the power source supply control device 100 controls the switches SW1 to SW4 based on the results of comparing the states of the power sources such as voltages with the predetermined states, so that the respective times t11, t21 and t31 shown in FIG. 2 are not predetermined. For example, while the power source voltage of the load side power source line 15-1 temporarily declines due to the influence of the inrush current flowing through the communication facility 12-1, and is in a state deviating from the condition retained by the monitor control unit 17-2, directly after the SW1 is closed, and the power source electric power supply to the first load side power source line 15-1 is started, the switch SW2 remains to be off. Subsequently, the switch SW2 is switched to on at the time t21 at which the power source voltage of the load side power source line 15-1 is in the state of satisfying the condition retained by the monitor control unit 17-2.

In the power source supply control device 100 shown in FIG. 1, the order of start of the power source electric power supply to the plurality of communication facilities 12-1 to 12-4 is determined fixedly by the circuit configuration of the power source supply control device 100. Accordingly, in order to change the order of start of the power source electric power supply, it is necessary to change the circuit configuration of the power source supply control device 100, that is, hardware, and the power source supply control device 100 cannot be used for general purposes. Thus, a power source supply control device that is universally usable by change of software will be described as another embodiment hereinafter.

Second Embodiment

<Configuration Example of Communication System>

Figure 3:
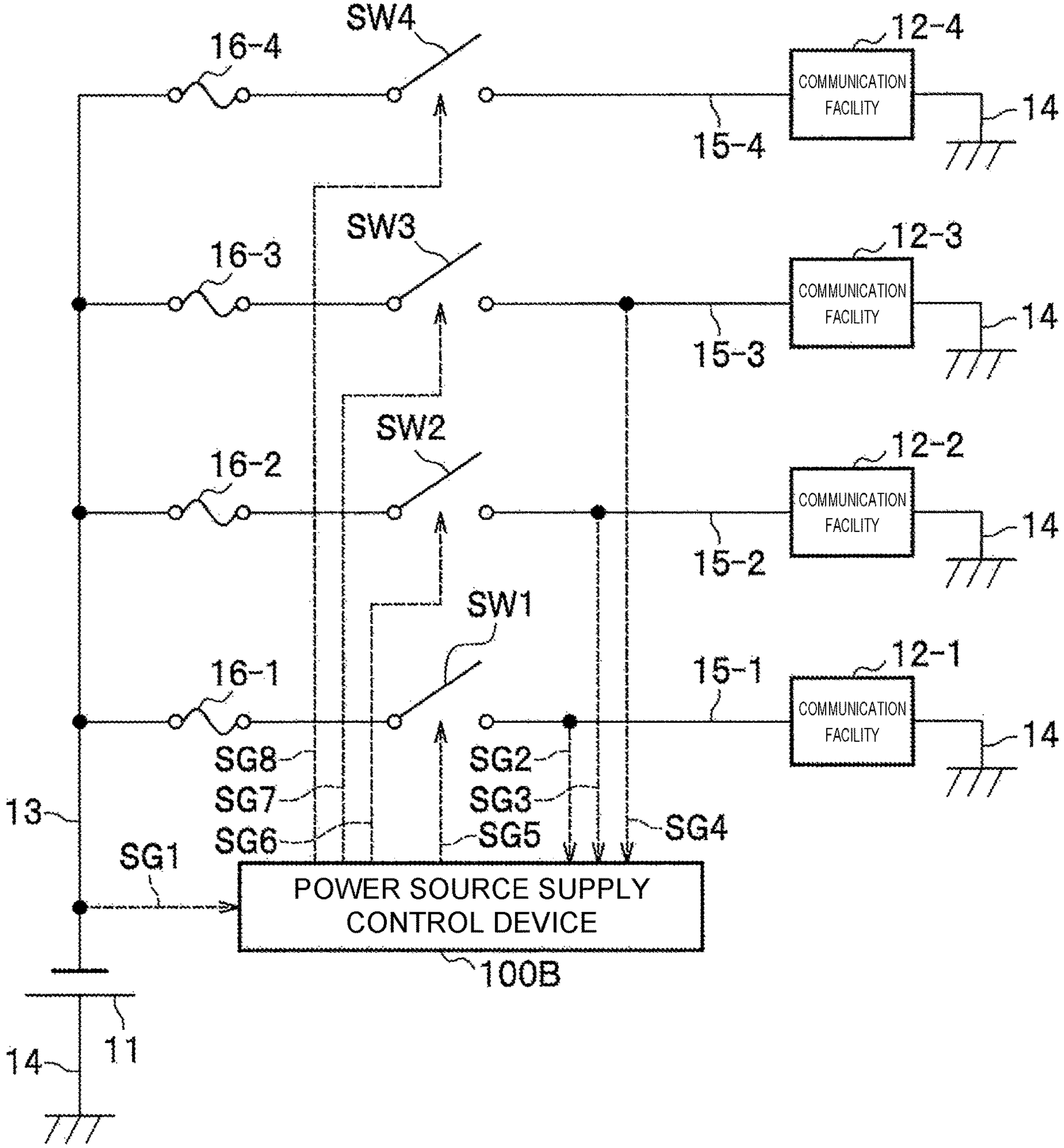
FIG. 3 is a block diagram showing a configuration example of a communication system including a power source supply control device of a second embodiment of the present invention.

A configuration example of a communication system including a power source supply control device 100B of a second embodiment of the present invention is shown in FIG. 3. In FIG. 3, common components to the configuration in FIG. 1 are shown by being assigned with same reference signs. In other words, in the communication system in FIG. 3, a configuration other than the power source supply control device 100B is same as in FIG. 1.

The communication system shown in FIG. 3 has a plurality of communication facilities 12-1 to 12-4 as objects to be controlled as in the communication system in FIG. 1, and the power source supply control device 100B in FIG. 3 has a function of properly controlling start and stop of power source electric power supply to the communication facilities 12-1 to 12-4.

The power source supply control device 100B in FIG. 3 realizes equivalent functions to the plurality of monitor control units 17-1 to 17-4 shown in FIG. 1, but can be used for general purposes even if the circuit configuration is not changed, by being controlled by software. The power source supply control device 100B can be realized by incorporating an input interface for monitoring a plurality of monitor signals SG1 to SG4, an output interface for controlling a plurality of switches SW1 to SW4, and exclusive programs and data for control into a main body of an ordinary personal computer, for example.

<Internal Configuration of Power Source Supply Control Device>

Figure 4:
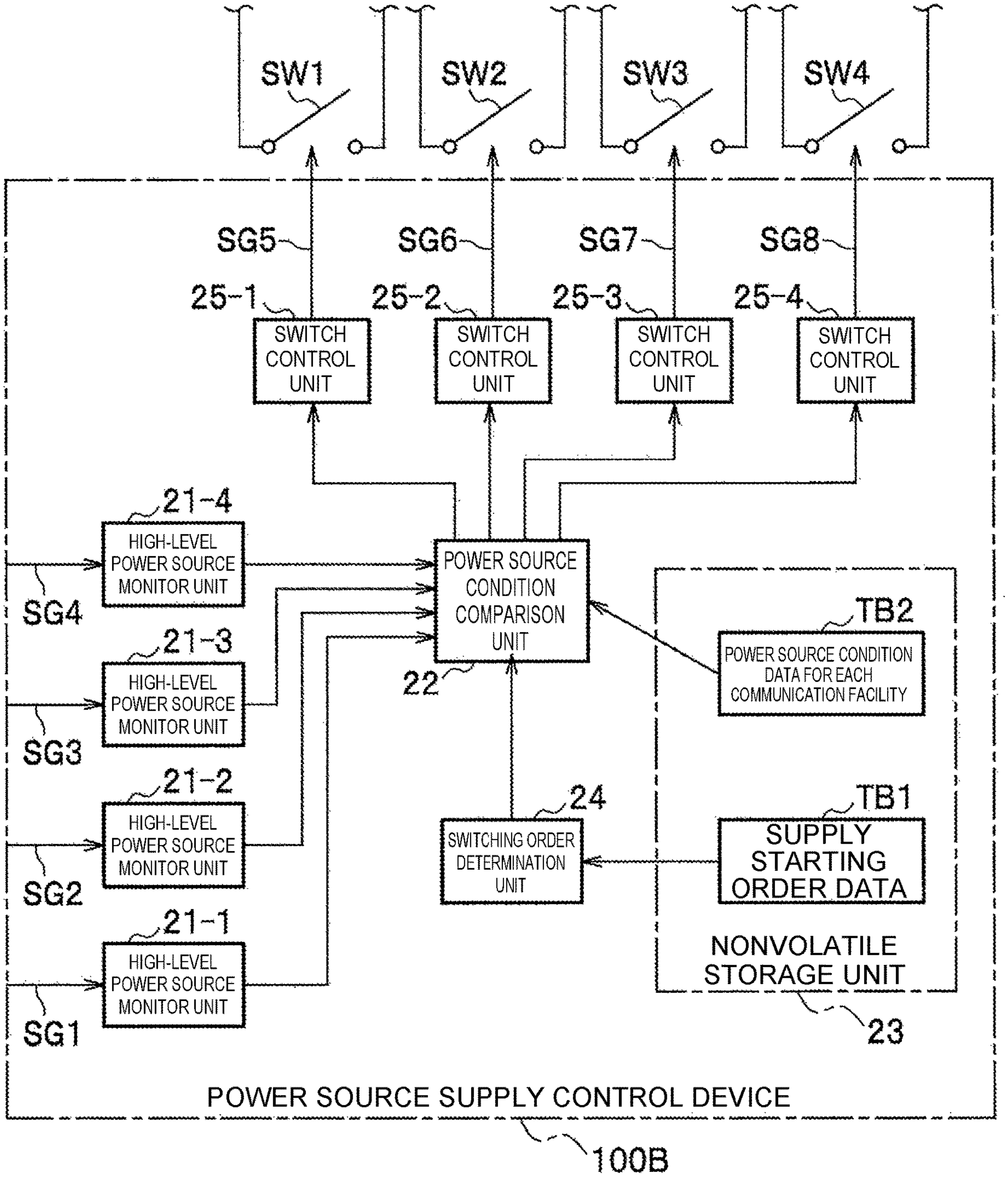
FIG. 4 is a block diagram showing an internal configuration of the power source supply control device shown in FIG. 3.

An internal configuration of the power source supply control device 100B shown in FIG. 3 is shown in FIG. 4.

As shown in FIG. 4, the power source supply control device 100B includes respective functions of a plurality of high-level power source monitor units 21-1 to 21-4, a power source condition comparison unit 22, a nonvolatile storage unit 23, a switching order determination unit 24, and a plurality of switch control units 25-1 to 25-4. Furthermore, the nonvolatile storage unit 23 retains supply starting order data TB1, and power source condition data TB2 for each communication facility, as predetermined data.

The respective high-level power source monitor units 21-1 to 21-4 shown in FIG. 4 can be realized by electric circuits that process signals of voltages or the like of monitor signals SG1 to SG4, analog/digital (A/D) converters, processing functions of a computer main body, and software for monitoring. Furthermore, the power source condition comparison unit 22 and the switching order determination unit 24 can be realized by processing functions of the computer main body, and a program that realizes a processing procedure of the present invention. As the nonvolatile storage unit 23, a hard disk attached to the computer main body, and a storage device such as a nonvolatile internal memory can be used. The respective switch control units 25-1 to 25-4 can be configured as output interfaces of a computer that can control on/off of the switches SW1 to SW4.

The supply starting order data TB1 is constant data in which a supply starting order of power source electric power to the plurality of communication facilities 12-1 to 12-4 that are loads to be controlled by the power source supply control device 100B. As for a content of the supply starting order data TB1, appropriate values are predetermined by a designer based on specifications of the main power source 11 and specifications of the communication facilities 12-1 to 12-4, and are retained on the nonvolatile storage unit 23.

The power source condition data TB2 for each communication facility defines the power source condition such as the voltage for start of power source electric power supply, with respect to each of the plurality of communication facilities 12-1 to 12-4 that are the loads to be controlled by the power source supply control device 100B. Concerning a content of the power source condition data TB2 for each communication facility, appropriate values are predetermined by the designer based on the specifications of the main power source 11 and the specifications of the communication facilities 12-1 to 12-4, and are retained on the nonvolatile storage unit 23.

The switching order determination unit 24 determines the supply starting order of the power source electric power to the respective communication facilities 12-1 to 12-4 in accordance with the content of the supply starting order data TB1 that is read from the nonvolatile storage unit 23.

The power source condition comparison unit 22 controls the switching order of the switches SW1 to SW4 in accordance with the order that is determined by the switching order determination unit 24, and compares power source states at each timepoint of the monitor signals SG1 to SG4, and the content of the power source condition data TB2 for each communication facility to determine a timing for switching each of the switches SW1 to SW4. In accordance with the comparison result, the power source condition comparison unit 22 sequentially switches on/off of the switches SW1 to SW4.

<Configuration Example of Supply Starting Order Data>

A configuration example of the supply starting order data TB1 is shown in FIG. 5.

The supply starting order data TB1 shown in FIG. 5 includes N sets of data formed of numbers 1, 2, . . . , N representing the respective communication facilities 12-1, 12-2, 12-3, . . . that are loads to be controlled, information A1, A2, . . . , AN representing types of the respective communication facilities 12-1, 12-2, . . . , 12-N, and numbers 1, 2, . . . , N representing the starting order of the respective communication facilities 12-1, 12-2, . . . , 12-N.

Accordingly, the switching order determination unit 24 can recognize that electric power supply can be started in the order of the communication facilities 12-1, 12-2, 12-3, . . . , from the content of the supply starting order data TB1. Furthermore, if the content of the supply starting order data TB1 is changed, the supply starting order of the power source electric power can be changed, so that it is possible to accommodate communication facilities of various specifications without changing the circuit configuration of the power source supply control device 100B. Note that the configuration of the supply starting order data TB1 can be changed as necessary.

<Configuration Example of Power Source Condition Data for Each Communication Facility>

A configuration example of the power source condition data TB2 for each communication facility is shown in FIG. 6.

The power source condition data TB2 for each communication facility shown in FIG. 6 includes N sets of data formed of numbers 1, 2, . . . , N representing the respective communication facilities 12-1, 12-2, 12-3, . . . that are loads to be controlled, information A1, A2, . . . , AN that represent types of the respective communication facilities 12-1, 12-2, . . . , 12-N, and conditions for switching the power source supply states of the respective communication facilities 12-1, 12-2, . . . , 12-N.

In the example shown in FIG. 6, a condition for switching the power source supply state to the first communication facility 12-1 is a state in which the monitor voltage Vx is between a constant representing a minimum value Vmin1 and a constant representing a maximum value Vmax1. Furthermore, a condition for switching the power source supply state to the second communication facility 12-2 is a state in which the monitor voltage Vx is between a constant representing a minimum value Vmin2 and a constant representing a maximum value Vmax2. The same applies to the other communication facilities, and the conditions for switching are individually determined.

Accordingly, when the power source condition comparison unit 22 is to start the power source electric power supply to the second communication facility 12-2, for example, the power source supply control device 100B determines timing for switching the switch SW2, based on a result of comparing the monitor voltage Vx of the monitor signal SG2 that is inputted from the high-level power source monitor unit 21-2, and the second minimum value Vmin2 and maximum value Vmax2 in the power source condition data TB2 for each communication facility.

If the content that is registered to each part of the power source condition data TB2 for each communication facility are changed, the power source supply control device 100B can change the power source condition to start the power source electric power supply individually for each communication facility. Accordingly, even when the specifications of the communication system to be controlled are changed, the power source supply control device 100B can properly accommodate the change in the specifications only by data change of the power source condition data TB2 for each communication facility.

<Procedure of Supply Start Control>

Figure 7:
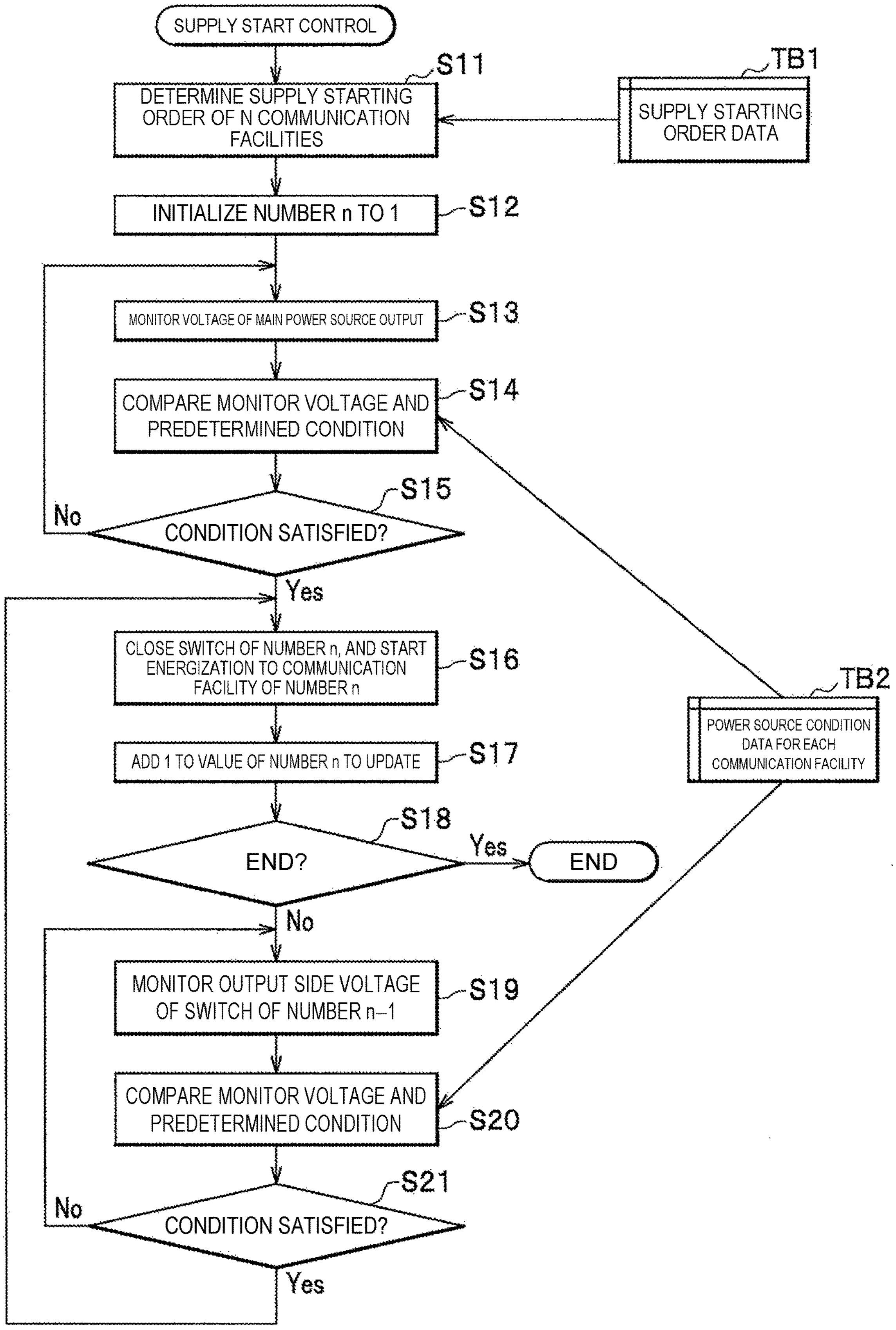
FIG. 7 is a flowchart showing a procedure of supply start control in the power source supply control device of the second embodiment of the present invention.

A procedure of supply start control in the power source supply control device of the second embodiment of the present invention is shown in FIG. 7.

In other words, the main body of the computer that realizes the power source supply control device 100B shown in FIG. 4 executes the control program corresponding to the content in FIG. 7, and thereby properly controls start of supply of the power source electric power to the N communication facilities 12-1 to 12-N that are loads to be controlled. Note that the example in FIG. 4 assumes the case in which the power source supply control device 100B controls only the communication facilities 12-1 to 12-4 of four systems, but a number of necessary components can be increased or decreased correspondingly to change in the total number N of the facilities to be controlled.

In the procedure shown in FIG. 7, the power source supply control device 100B uses, for example, the supply starting order data TB1 and the power source condition data TB2 for each communication facility shown in FIG. 4 to FIG. 6. The procedure shown in FIG. 7 will be described hereinafter.

In first step S11, the switching order determination unit 24 reads the content of the supply starting order data TB1 and specifies the supply starting order of N communication facilities in accordance with the content.

In next step S12, the power source condition comparison unit 22 initializes a number n that identifies an object to be processed from the communication facilities or the like of N systems to "1".

In step S13, the communication facility or the like of the first system is the object to be processed, so that the power source condition comparison unit 22 successively receives a voltage of the power source line 13 as a voltage Vx of the monitor signal SG1 by using the high-level power source monitor unit 21-1.

In step S14, the power source condition comparison unit 22 refers to the condition of the first system in the power source condition data TB2 for each communication facility, and compares this condition with the monitor voltage Vx received in step S13. When the comparison result does not satisfy the condition, the power source condition comparison unit 22 repeats the processes of steps S13 to S15, and proceeds from step S15 to S16 when the comparison result satisfies the condition.

In step S16, the power source condition comparison unit 22 controls any one of the switch control units 25-1, 25-2, . . . to close a contact of a switch SWn the switching order of which is the $n^{th}$ among the switches SW1, SW2, . . . , and starts power source electric power supply to the $n^{th}$ communication facility 12-*n*. Here, by start of supply of the power source electric power, the $n^{th}$ communication facility 12-*n* can start operation.

In step S17, the power source condition comparison unit 22 adds 1 to the number n to change the content.

In step S18, the power source condition comparison unit 22 identifies whether or not the processes to all the communication facilities to be controlled are ended, proceeds to processes of next step S19 and the following steps when the processes are not ended, and repeats the processes until the processes are ended.

In step S19, the power source condition comparison unit 22 receives a power source voltage at a downstream side of an $n-1^{th}$ switch SWn−1 that is switched just before an $n^{th}$ object to be processed of this time from an $n^{th}$ high-level power source monitor unit 21-*n* and monitors the power source voltage as the monitor voltage Vx.

In step S20, the power source condition comparison unit 22 acquires the switching condition of the power source that is allocated to the $n^{th}$ communication facility that is the object to be processed of this time from the power source condition data TB2 for each communication facility, and compares the switching condition of the power source with the monitor voltage Vx in step S19. When the comparison result in step S20 does not satisfy the condition, the power source condition comparison unit 22 repeats the processes of steps S19 to S21, proceeds from step S21 to S16 when the comparison result satisfies the condition, and closes the $n^{th}$ switch.

Accordingly, by executing the processing procedure shown in FIG. 7, it is possible to switch the respective switches SW1, SW2, . . . as in FIG. 2, for example, and it is possible to control start of supply of the power source electric power to the plurality of communication facilities 12-1, 12-2, . . . in the predetermined order and at timing according to the predetermined condition of the power source. Consequently, it becomes easy to activate each of the plurality of communication facilities 12-1 to 12-4 included in the communication system in a stable state, and it is possible to prevent the main power source 11 from being overloaded, or the output of the main power source 11 from becoming unstable.

<Procedure of Supply Stop Control>

Figure 8:
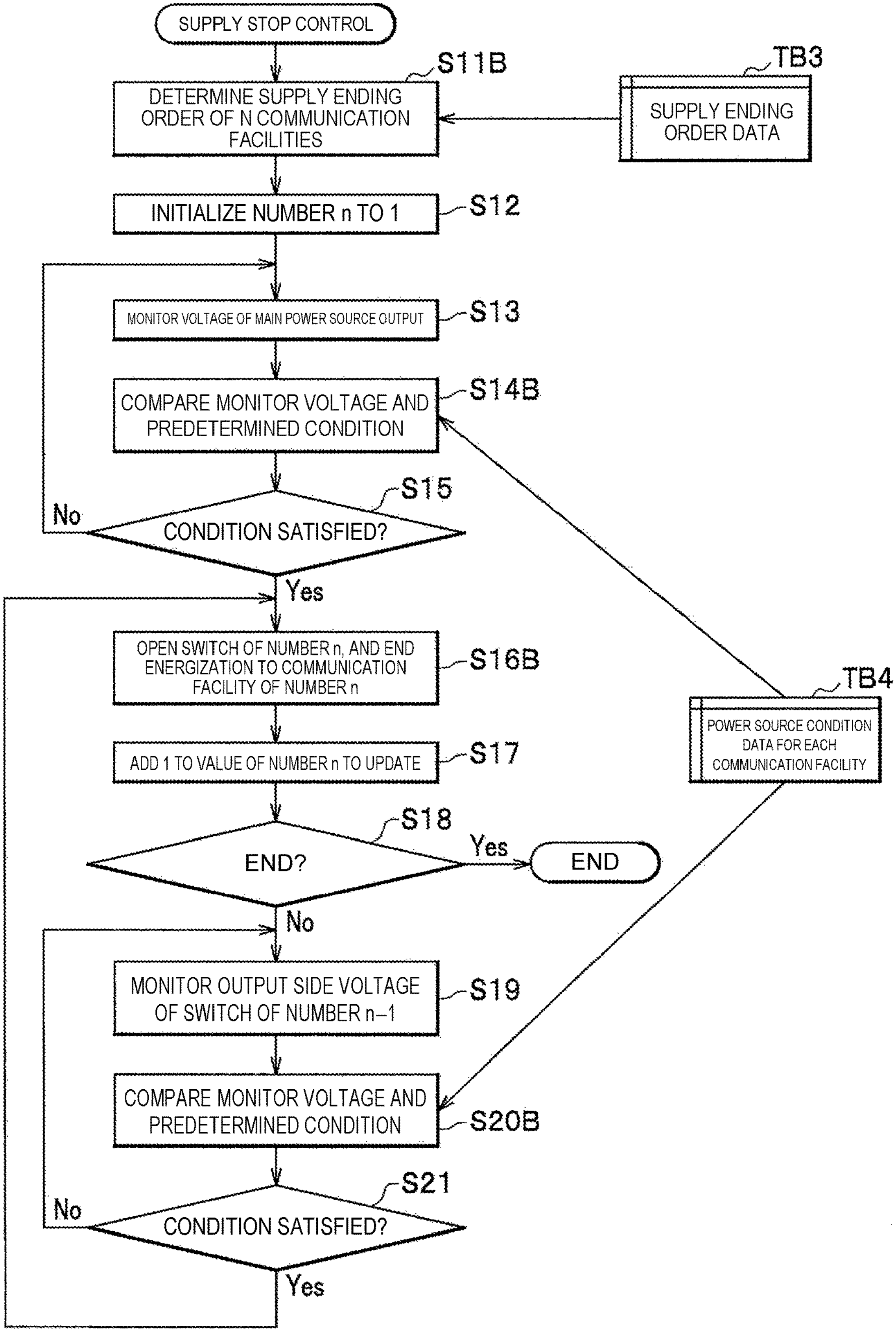
FIG. 8 is a flowchart showing a procedure of supply stop control in the power source supply control device of the second embodiment of the present invention.

A procedure of supply stop control in the power source supply control device 100B of the second embodiment of the present invention is shown in FIG. 8.

In other words, the main body of the computer that realizes the power source supply control device 100B shown in FIG. 4 executes a control program corresponding to a content in FIG. 8, and thereby properly controls stop of supply of the power source electric power to the N communication facilities 12-1 to 12-N that are the loads to be controlled.

In the procedure shown in FIG. 8, the power source supply control device 100B uses supply ending order data TB3 instead of the supply starting order data TB1 shown in FIG. 4 and uses power source condition data TB4 for each communication facility that differs in content from the power source condition data TB2 for each communication facility.

The supply ending order data TB3 that is used in the procedure in FIG. 8 is configured to retain data of a number representing a "stopping order" instead of the "starting order" in the supply starting order data TB1 shown in FIG. 5, for example. Furthermore, the power source condition data TB4 for each communication facility used in the procedure in FIG. 8 is configured to retain the data of the power source condition when switching each of the switches from close to open as the "power source condition" in the power source condition data TB2 for each communication facility shown in FIG. 6.

Furthermore, in FIG. 8, common steps to the procedure in FIG. 7 are shown by being assigned with the same step numbers. The procedure shown in FIG. 8 will be described hereinafter.

In first step S11B, the switching order determination unit 24 reads a content of the supply ending order data TB3, and specifies a supply starting order of the N communication facilities in accordance with the content.

In next step S12, the power source condition comparison unit 22 initializes the number n identifying the object to be processed from the communication facilities or the like of the N systems to "1".

In step S13, the communication facility or the like of the first system is the object to be processed, so that the power source condition comparison unit 22 successively receives the voltage of the power source line 13 as the voltage Vx of the monitor signal SG1 by using the high-level power source monitor unit 21-1.

In step S14B, the power source condition comparison unit 22 refers to the condition of the first system of the power source condition data TB4 for each communication facility, and compares the condition with the monitor voltage Vx received in step S13. When the comparison result does not satisfy the condition, the power source condition comparison unit 22 repeats processes of steps S13 to S15, and proceeds from step S15 to S16B when the comparison result satisfies the condition.

In step S16B, the power source condition comparison unit 22 controls any one of the switch control units 25-1, 25-2, . . . to open a contact of the switch SWn the switching order of which is the $n^{th}$ among the switches SW1, SW2, . . . , and ends the power source electric power supply to the $n^{th}$ communication facility 12-*n*. Here, the $n^{th}$ communication facility 12-*n* stops operation by end of supply of the power source electric power.

In step S17, the power source condition comparison unit 22 adds 1 to the number n to update the content.

In step S18, the power source condition comparison unit 22 identifies whether or not the processes to all the communication facilities that are the objects to be controlled are ended, proceeds to processes of step S19 and the following steps when the processes to all the communication facilities are not ended, and repeats the processes until the processes to all the communication facilities are ended.

In step S19, the power source condition comparison unit 22 receives a power source voltage at a downstream side of an $n-1^{th}$ switch SWn−1 that is switched just before an $n^{th}$ object to be processed of this time from an $n^{th}$ high-level power source monitor unit 21-*n* and monitors the power source voltage as the monitor voltage Vx.

In step S20B, the power source condition comparison unit 22 acquires the switching condition of the power source that is allocated to the $n^{th}$ communication facility that is the object to be processed of this time from the power source condition data TB4 for each communication facility, and compares the switching condition of the power source with the monitor voltage Vx in step S19. When the comparison result in step S20B does not satisfy the condition, the power source condition comparison unit 22 repeats the processes of steps S19 to S21, proceeds from step S21 to S16 when the comparison result satisfies the condition, and opens the $n^{th}$ switch.

Accordingly, by executing the processing procedure shown in FIG. 8, it is possible to switch the respective switches SW1, SW2, . . . from on to off sequentially, contrary to the operation shown in FIG. 2, for example, and it is possible to control stop of supply of the power source electric power to the plurality of communication facilities 12-1, 12-2, . . . in the predetermined order and at timing according to the predetermined condition of the power source. Consequently, it becomes easy to stop each of the plurality of communication facilities 12-1 to 12-4 included in the communication system in a stable state.

MODIFIED EXAMPLE-1 OF SUPPLY START CONTROL

Figure 9:
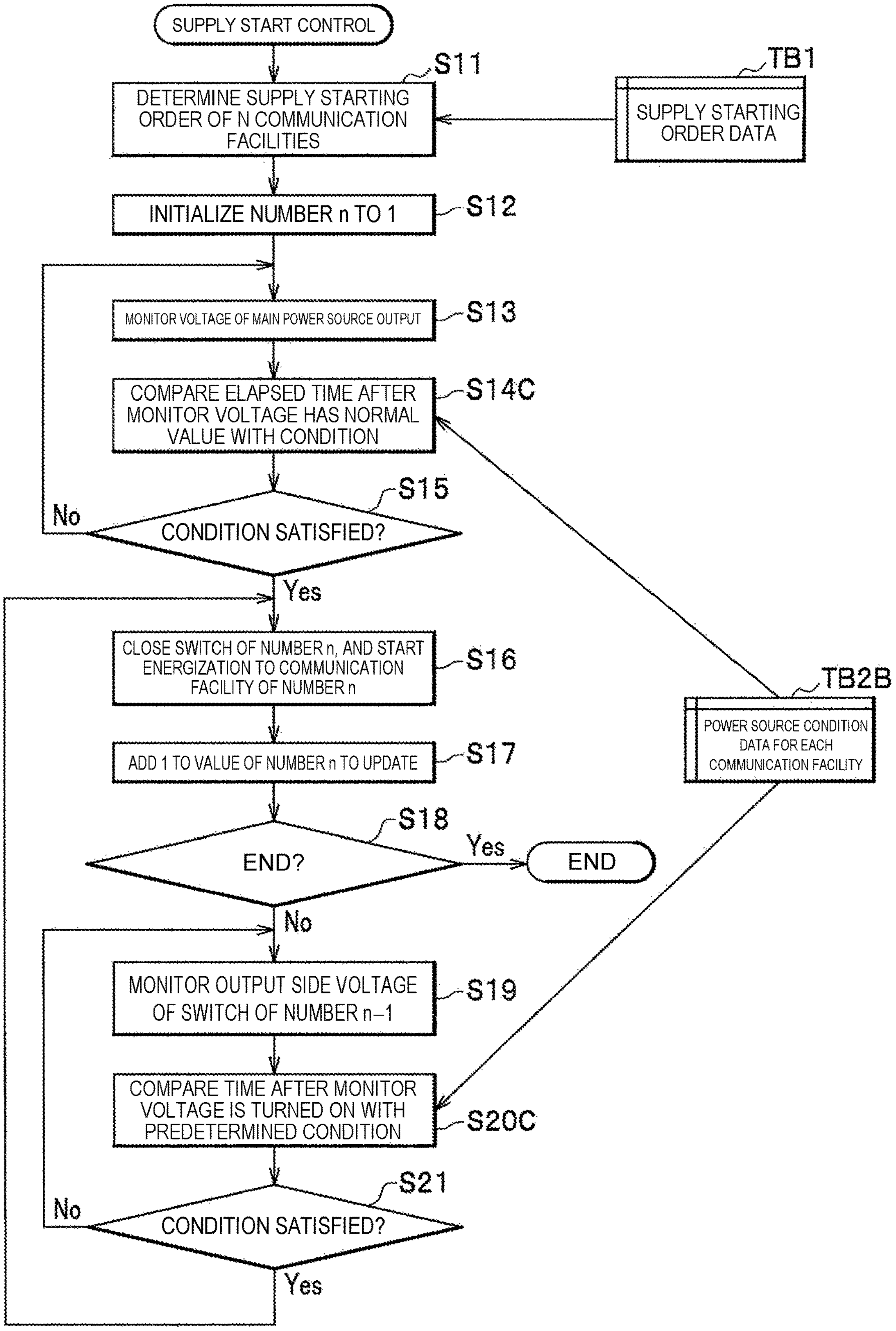
FIG. 9 is a flowchart showing a modified example-1 of supply start control.

A modified example-1 of the "supply start control" shown in FIG. 7 is shown in FIG. 9.

In other words, the main body of the computer that realizes the power source supply control device 100B shown in FIG. 4 executes a control program corresponding to a content in FIG. 9, and thereby properly controls start of supply of the power source electric power to the N communication facilities 12-1 to 12-N that are loads to be controlled.

In a procedure shown in FIG. 9, the power source supply control device 100B uses power source condition data TB2B for each communication facility that differs in content from the power source condition data TB2 for each communication facility shown in FIG. 4. The power source condition data TB2B for each communication facility used in the procedure in FIG. 9 is configured to retain data specifying a length of an elapsed time after the monitor voltage Vx is switched to a normal on-level, rather than a voltage range of the monitor voltage Vx, as the "power source condition" in the power source condition data TB2 for each communication facility shown in FIG. 6.

Furthermore, in FIG. 9, common steps to the procedure in FIG. 7 are shown by being assigned with the same step numbers. The procedure shown in FIG. 9 will be described hereinafter.

In respective steps S11 to S13 in FIG. 9, the computer main body of the power source supply control device 100B executes the operations already described.

In step S14C in FIG. 9, the power source condition comparison unit 22 refers to a condition of the first system in the power source condition data TB2B for each communication facility, and compares a specified time of this condition, and an elapsed time after the monitor voltage Vx is switched to a specified on-level. When the comparison result does not satisfy the condition, the power source condition comparison unit 22 repeats processes in steps S13 to S15, and proceeds from step S15 to S16 after the comparison result satisfies the condition.

In respective steps S16 to S19 in FIG. 9, the computer main body of the power source supply control device 100B executes the operations already described.

In step S20C in FIG. 9, the power source condition comparison unit 22 acquires a power source switching condition allocated to the $n^{th}$ communication facility that is an object to be processed of this time from the power source condition data TB2B for each communication facility, and compares a specified time of this condition and an elapsed time after the monitor voltage Vx is switched to a specified on-level. When the comparison result in step S20C does not satisfy the condition, the power source condition comparison unit 22 repeats the processes in steps S19 to S21, proceeds from step S21 to S16 when the comparison result satisfies the condition, and closes an $n^{th}$ switch.

Accordingly, by executing the processing procedure shown in FIG. 9, it is possible to switch the respective switches SW1, SW2, . . . as in FIG. 2, for example, and it is possible to control start of supply of the power source electric power to the plurality of communication facilities 12-1, 12-2, . . . in the predetermined order and at the timing according to the predetermined condition of the power source. Consequently, it becomes easy to activate each of the plurality of communication facilities 12-1 to 12-4 included in the communication system in a stable state, and it is possible to prevent the main power source 11 from being overloaded, or the output of the main power source 11 from becoming unstable.

A behavior of the monitor voltage Vx directly after the power source electric power supply to the respective loads is started is not always constant. However, it is conceivable that the monitor voltage Vx becomes stable by a certain amount of time elapsing after the power source electric power supply is started. Accordingly, it is possible to realize stable control by specifying a relatively long time with an enough margin in the power source condition data TB2B for each communication facility, as the switching condition of the power source. However, a time taken to switch tends to be long as compared with the procedure in FIG. 7.

MODIFIED EXAMPLE-2 OF SUPPLY START CONTROL

Figure 10:
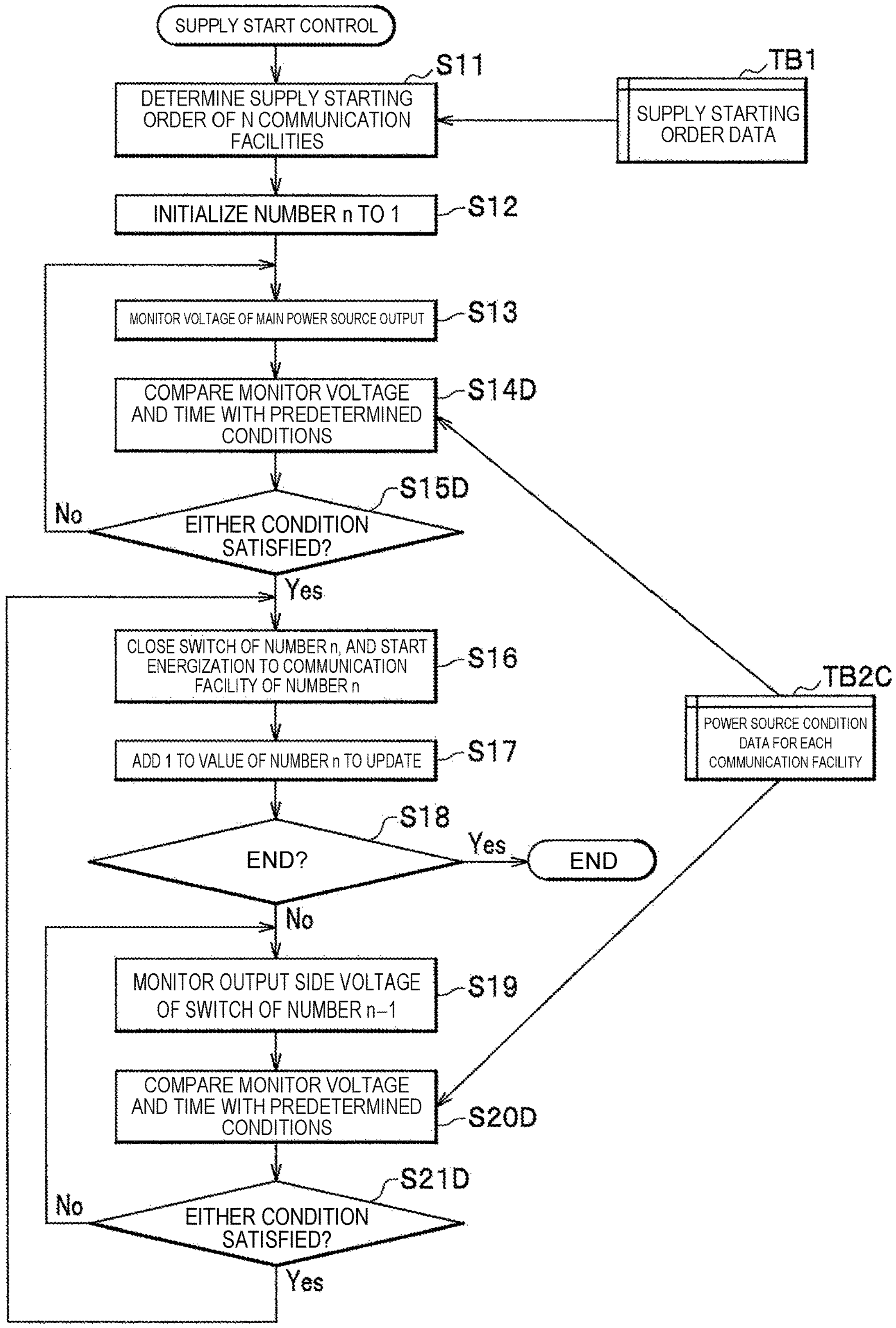
FIG. 10 is a flowchart showing modified example-2 of the supply start control.

Modified example-2 of the supply start control shown in FIG. 7 is shown in FIG. 10.

In other words, the main body of the computer that realizes the power source supply control device 100B shown in FIG. 4 executes the control program corresponding to the content in FIG. 10, and thereby properly controls start of supply of the power source electric power to the N communication facilities 12-1 to 12-N that are loads to be controlled.

In the procedure shown in FIG. 10, the power source supply control device 100B uses power source condition data TB2C for each communication facility that differs in content from the power source condition data TB2 for each communication facility shown in FIG. 4. The power source condition data TB2C for each communication facility that is used in the procedure in FIG. 10 is configured to retain data that specifies a length of an elapsed time after the monitor voltage Vx is switched to a normal on-level, in addition to a voltage range of the monitor voltage Vx, as the "power source condition" in the power source condition data TB2 for each communication facility shown in FIG. 6.

Further, in FIG. 10, common steps to the procedure in FIG. 7 are shown by being assigned with same step numbers. A procedure shown in FIG. 10 will be described hereinafter.

In respective steps S11 to S13 in FIG. 10, the computer main body of the power source supply control device 100B executes the operation already described.

In step S14D in FIG. 10, a power source condition comparison unit 22 refers to a condition of a first system in the power source condition data TB2C for each communication facility, and compares each of a voltage range and a specified time included in the condition, with the monitor voltage Vx.

When either one of the conditions that the monitor voltage Vx satisfies the condition of the voltage range, and that an elapsed time after the monitor voltage Vx is switched to the on-level becomes the specified time, the power source condition comparison unit 22 proceeds from step S15D to S16, and when the comparison result satisfies none of the conditions, the power source condition comparison unit 22 repeats processes in steps S13 to S15D.

Note that concerning step S15D, the process may be changed so that the power source condition comparison unit 22 proceeds to step S16 only when the monitor voltage Vx satisfies both the conditions of the voltage range and the elapsed time. Further, in that case, the elapsed time after the monitor voltage Vx satisfies the condition of the voltage range may be compared with the specified time.

In respective steps S16 to S19 in FIG. 10, the computer main body of the power source supply control device 100B executes the operations that are already described.

In step S20D in FIG. 10, the power source condition comparison unit 22 acquires a power source switching condition allocated to the $n^{th}$ communication facility that is an object to be processed of this time from the power source condition data TB2B for each communication facility, and compares each of the voltage range and the specified time included in the condition, and the monitor voltage Vx.

When either one of the conditions that the monitor voltage Vx satisfies the condition of the voltage range, and the condition that the elapsed time after the monitor voltage Vx is switched to the on-level becomes the specified time, the power source condition comparison unit 22 proceeds from step S21D to S16, and closes the $n^{th}$ switch. When the comparison result satisfies none of the conditions, the power source condition comparison unit 22 repeats the processes of steps S19 to S21D.

Note that concerning step S21D, the process may be changed so that the power source condition comparison unit 22 proceeds to step S16 only when the monitor voltage Vx satisfies both the conditions of the voltage range and the elapsed time. Furthermore, in that case, the elapsed time after the monitor voltage Vx satisfies the condition of the voltage range may be compared with the specified time.

<Advantage of Power Source Supply Control Device>

In the power source supply control device 100 shown in FIG. 1, it is possible to fix the order of starting the power source electric power supply to the communication facilities 12-1 to 12-4 that are the loads to be controlled, in advance, by the configuration of the circuit connection state of the plurality of monitor control units 17-1 to 17-4. Furthermore, it is possible to predetermine the conditions for starting and stopping the power source electric power supply and incorporate the conditions into the respective monitor control units 17-1 to 17-4. Furthermore, since the respective monitor control units 17-1 to 17-4 monitor the states of the power sources in the high-level power source line 13, or the load side power source lines 15-1 to 15-3 the states of which are switched earlier than the loads to be controlled, so that after the voltage or the like of the power source is stabilized after energization to one load is started, energization to a next load can be started. Consequently, supply of the power source electric power is less influenced by the inrush current or the like flowing through the load at the time of start of energization, and even if the power source capacity of the main power source 11 does not have a large margin, it is possible to activate a plurality of loads in a stable state. Furthermore, when each of the fuses 16-1 to 16-4 is blown, it is possible to reflect blowing of the fuse in control.

Furthermore, the power source supply control device 100B shown in FIG. 3 can be used to control the communication facilities of various specifications without changing the circuit configuration. In other words, since the order of starting power source electric power supply to the communication facilities 12-1 to 12-4 that are the loads to be controlled is determined based on the supply starting order data TB1 shown in FIG. 4, and the condition to start the power source electric power supply is determined based on the power source condition data TB2 for each communication facility, it is possible to use common hardware and apply it for various purposes by only amendment of the data.

Furthermore, when the processing procedure shown in FIG. 9 is to be adopted, the elapsed time is monitored to determine the switching timing in respective steps S14C, and S20C, so that there is no need to measure the monitor voltage Vx with high accuracy, and it is also easy to simplify the contents of the processes.

Furthermore, when the processing procedure shown in FIG. 7 is to be adopted, the state of the voltage or the like of the power source is monitored in respective steps S14 and S20, so that even when energization to one load is started and thereafter, the power source voltage becomes unstable temporarily due to an influence of the energization, it is possible to start energization to the next load after waiting until the power source voltage is actually stabilized. Consequently, it is possible to start operations of the plurality of communication facilities 12-1 to 12-4 in a stable state even if humans do not intervene in the operation.

Furthermore, when the processing procedure shown in FIG. 10 is to be adopted, both of the conditions of the power source voltage and the time are compared in respective steps S14D and S20D, so that energization start control with higher accuracy is enabled. For example, the state of the switch is switched, after a predetermined time of a margin further elapses after the monitor voltage Vx is stabilized within a specific voltage range, and thereby it is possible to enhance stability of control.

Furthermore, the power source condition data TB2 for each communication facility shown in FIG. 6, for example, includes data on the power source condition that is independent for each communication facility, so that it is possible to optimize the condition of the power source at the time of starting energization according to the unique characteristics of each of the communication facilities.

REFERENCE SIGNS LIST

11 Main power source
12-1, 12-2, 12-3, 12-4 Communication facility
13 Power source line
14 Earth line
15-1, 15-2, 15-3, 15-4 Load side power source line
16-1, 16-2, 16-3, 16-4 Fuse
17-1, 17-2, 17-3, 17-4 Monitor control unit
21-1, 21-2, 21-3, 21-4 High-level power source monitor unit
22 Power source condition comparison unit
23 Nonvolatile storage unit
24 Switching order determination unit
25-1, 25-2, 25-3, 25-4 Switch control unit
100, 100B Power source supply control device
SW1, SW2, SW3, SW4 Switch
SG1, SG2, SG3, SG4 Monitor signal
SG5, SG6, SG7, SG8 Control signal
TB1 Supply starting order data
TB2, TB2B, TB2C, TB4 Power source condition data for each communication facility
TB3 Supply ending order data

The invention claimed is:

1. A power source supply control device for communication facilities, the power source supply control device configured to supply power source electric power to a plurality of independent loads constituting communication facilities respectively from a common main power source, or a plurality of main power sources belonging to a same system, comprising:

a nonvolatile memory configured to store data indicating a starting order of power supply to the plurality of independent loads;

a plurality of controllable switches configured to switch provision or non-provision of power source electric power supply to the respective plurality of loads from the main power source, a plurality of power source monitors each configured to monitor a power source state in each of power source lines at a downstream side of one or more of the plurality of switches; and a switch controller configured to control on/off of each of the plurality of switches sequentially, based on the data indicating the starting order and monitor situations of the plurality of power source monitors, wherein the switch controller specifies an energization switching order to the plurality of loads according to a predetermined state, and switches on/off of the switch that controls energization to a second load, after a power source is in a state that meets a predetermined condition, based on output of the power source monitor that monitors electric power supply to a first load the energization switching order of which is earlier than the second load that is an object to be switched.

2. The power source supply control device for communication facilities according to claim 1, wherein the switch controller switches on/off of the switch that controls energization to the second load after a predetermined fixed time elapses after a power source supply state is switched, based on the output of the power source monitor that monitors the electric power supply to the first load the energization switching order of which is earlier than the second load that is the object to be switched.

3. The power source supply control device for communication facilities according to claim 1, wherein the switch controller switches on/off of the switch that controls energization to the second load, after at least one of a voltage and a current of the corresponding power source line is in a state that meets a predetermined condition, based on output of the power source monitor that monitors the electric power supply to the first load the energization switching order of which is earlier than the second load that is the object to be switched.

4. The power source supply control device for communication facilities according to claim 1, wherein the switch controller switches on/off of the switch that controls energization to the second load, after either one or both of a first condition indicating that a predetermined fixed time elapses after a power source supply state is switched, and a second condition indicating that at least one of a voltage and a current of the corresponding power source line is in a state that meets a predetermined condition, based on output of the power source monitor that monitors the power supply to the first load the energization switching order of which is earlier than the second load that is the object to be switched.

5. The power source supply control device for communication facilities according to claim 1, wherein the switch controller is configured to retain information on a predetermined condition for controlling energization to the second load individually for each load.

6. A power source supply control method for supplying power source electric power to a plurality of independent loads constituting communication facilities respectively from a common main power source, or a plurality of main power sources belonging to a same system, comprising:

obtaining data indicating a starting order of power supply to the plurality of independent loads;

specifying an energization switching order to the plurality of loads, according to a predetermined state and the data indicating the starting order;

monitoring electric power supply to a first load the energization switching order of which is earlier than a second load that is an object to be switched, among the plurality of loads; and switching on/off of energization to the second load after an electric power supply state that is monitored becomes a state that meets a predetermined condition.

7. A memory device storing a power source supply control program executable by a predetermined computer that performs operations to control to supply power source electric power to a plurality of independent loads constituting communication facilities respectively from a common main power source, or a plurality of main power sources belonging to a same system, the operations comprising:

obtaining data indicating a starting order of power supply to the plurality of independent loads;

specifying an energization switching order to the plurality of loads, according to a predetermined state and the data indicating the starting order;

monitoring electric power supply to a first load the energization switching order of which is earlier than a second load that is an object to be switched, among the plurality of loads; and switching on/off of energization to the second load after an electric power supply state that is monitored becomes a state that meets a predetermined condition.

* * * * *